(12) United States Patent
Turnquist et al.

(10) Patent No.: US 10,114,442 B2
(45) Date of Patent: Oct. 30, 2018

(54) SYSTEM AND A METHOD FOR CONTROLLING OPERATING VOLTAGE

(71) Applicant: Minima Processor Oy, Oulu (FI)

(72) Inventors: Matthew Turnquist, Espoo (FI); Lauri Koskinen, Helsinki (FI); Markus Hiienkari, Helsinki (FI); Jani Mäkipää, Espoo (FI)

(73) Assignee: MINIMA PROCESSOR OY, Oulu (FI)

( * ) Notice: Subject to any disclaimer, the term of this patent is extended or adjusted under 35 U.S.C. 154(b) by 164 days.

(21) Appl. No.: 15/381,170

(22) Filed: Dec. 16, 2016

(65) Prior Publication Data

US 2017/0177056 A1 Jun. 22, 2017

(30) Foreign Application Priority Data

Dec. 17, 2015 (GB) .................... 1522266.4

(51) Int. Cl.
*G06F 1/00* (2006.01)
*G06F 1/32* (2006.01)
*G06F 1/08* (2006.01)

(52) U.S. Cl.
CPC ............... *G06F 1/324* (2013.01); *G06F 1/08* (2013.01); *G06F 1/3296* (2013.01); *Y02D 10/126* (2018.01); *Y02D 10/172* (2018.01)

(58) Field of Classification Search
None
See application file for complete search history.

(56) References Cited

U.S. PATENT DOCUMENTS 8,072,796 B2 12/2011 Barbier et al.
8,126,497 B1 * 2/2012 Vargantwar ........... H04W 52/12
370/318

(Continued)

FOREIGN PATENT DOCUMENTS

WO WO-2011/003083 A1 1/2011
WO WO-2013/010164 A1 1/2013

OTHER PUBLICATIONS

Search Report under Section 17(5) issued by the United Kingdom Intellectual Property Office in relation to GB1522266.4 dated Jun. 7, 2016 (5 pages).

*Primary Examiner* — Paul Yen
(74) *Attorney, Agent, or Firm* — Robert P. Michal, Esq.; Carter, DeLuca, Farrell & Schmidt, LLP

(57) ABSTRACT

A control system for controlling an operating voltage of an electronic device is presented. The electronic device includes a timing event detector responsive to timing events, such as errors, related to operation of the electronic device. The control system includes a controller for decreasing the operating voltage when the rate of timing events is below a target level and for increasing the operating voltage when the rate of timing events exceeds the target level to search for a threshold voltage that is the smallest operating voltage at which the rate of timing events is substantially at the target level. The control system further includes a controllable clock signal generator for producing a clock signal for operating the electronic device so that the clock frequency is according to an increasing function of the operating voltage. Thus, it is possible to find a voltage-frequency operating point where the energy consumption is minimized.

19 Claims, 4 Drawing Sheets

(56) References Cited

U.S. PATENT DOCUMENTS

| | | |
|---|---|---|
| 8,237,477 B1 | 8/2012 | Hsieh et al. |
| 8,924,902 B2 | 12/2014 | Chua-Eoan |
| 2002/0138159 A1 | 9/2002 | Atkinson |
| 2005/0107967 A1 | 5/2005 | Patel et al. |
| 2007/0288798 A1 | 12/2007 | Flautner et al. |
| 2010/0095137 A1 | 4/2010 | Bieswanger et al. |
| 2013/0007516 A1* | 1/2013 | Wu .................. G06F 11/076 714/15 |

* cited by examiner

SYSTEM AND A METHOD FOR CONTROLLING OPERATING VOLTAGE

CROSS-REFERENCE TO RELATED APPLICATION

This Application claims priority to United Kingdom Application No. GB1522266.4, filed Dec. 17, 2015 the entire disclosure of which is incorporated herein by reference.

FIELD OF THE DISCLOSURE

The disclosure relates generally to controlling energy consumption of electronic devices such as, for example but not necessarily, a digital processor circuit. More particularly, the disclosure relates to a method and a system for controlling operating voltage supplied to an electronic device. Furthermore, the disclosure relates to a computer program for controlling operating voltage supplied to an electronic device.

BACKGROUND

In many cases the energy consumption of an electronic device, such as a digital processor circuit, is a critical issue. For example, technologies such as the Internet-of-Things "IoT", the Industrial Internet "II", and the Internet-of-Everything "IoE" are on the threshold of a massive breakthrough, and the major drivers behind the breakthrough are ubiquitous wireless processing nodes. However, the energy consumption of transmitting a bit across a given distance does not scale with Moore's law as advantageously as the digital processing within a wireless node. Therefore the energy cost of wireless transmission will proportionally grow when compared to digital processing. Increasing the energy efficiency thus requires increasing the amount of intra-node processing in order to minimize the wireless transmission of data. Therefore, the processor and the digital signal processing "DSP" will become one of the, if not the, most important parts to be optimized. This will be compounded by the increasing functionalities of the wireless node, such as e.g. Machine Learning, Video, etc.

For example, in conventional digital Complementary Metal Oxide Semiconductor "CMOS" designs, the operating voltage i.e. the power supply voltage VDD is typically 1 Volt or greater. The energy consumption indicated by the power consumption is substantially quadratically dependent on the operating voltage VDD, i.e. the power consumption is substantially proportional to $VDD^2$. Therefore, there is a strong motivation to reduce the operating voltage VDD for a wide range of applications from energy-constrained systems, e.g. the Internet-of-Things "IoT", to thermal-constrained systems, e.g. servers. There is a lower bound on the operating voltage VDD due to: a) functional limitations of the technology such as e.g. the CMOS technology and b) performance limitations such as e.g. limitations on the operating speed. By operating slightly above the lower bound of the operating voltage VDD, or near the threshold voltage, "NTV", the digital design is robust, has low energy consumption, and has a good performance. Thus, there is an increasingly large amount of researchers and companies building digital NTV designs. In some cases and especially in conjunction with central processing units "CPU", the operating voltage is often called core voltage.

A potential market of the NTV is in near-future electronics for applications such as the above-mentioned IoT and wireless wellbeing and healthcare. Growth in the healthcare industry is expected to be one of the major drivers and is expected to have a positive impact on embedded system demand. This can be attributed to the substantial number of embedded systems used in medical devices such as blood glucose monitors.

Ideally, an electronic system would be able to scale its operation from the nominal operating voltage down to the NTV. However, reducing the operating voltage below the threshold voltage results in a dramatic loss in performance and in practice may lead to functional failure. Therefore, in order to operate at the NTV, there needs to be a method to identify where the threshold voltage is located. The method is advantageously dynamic since the threshold voltage in for example CMOS devices changes with both local and global variations, e.g. temperature. In addition, a body bias is used in modern CMOS to intentionally move the threshold voltage. In a known technical solution for reducing the energy consumption, the operating voltage VDD is determined with the aid of a look-up table which gives the value of the operating voltage as a function of operating parameters such as for example throughput requirements and/or temperature. However, the look-up table is finalized at the design phase of the electronic system and therefore the look-up table has to include a safety margin to overcome dynamic changes and post-design variables. This safety margin leads to energy loss at run time.

Technical solutions usable in conjunction with and/or related to optimizing energy consumption are described for example in the following publications: U.S. Pat. Nos. 8,924,902, 8,237,477, and 8,072,796.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts in a simplified form as a prelude to a more detailed description of exemplifying embodiments of the invention.

In accordance with the invention, there is provided a new control system for controlling operating voltage VDD supplied to an electronic device such as e.g. a digital processor circuit. The electronic device is provided with a timing event detector responsive to timing events related to the operation of the electronic device. The timing events can be for example responsive to errors related to the operation of the electronic device, and/or to signals about the dynamic operation of the device, such as time-borrowing signals, and/or to any other signals or events directly or indirectly indicative of quality, performance, or some other appropriate property or properties of the operation of the electronic device.

A control system according to the invention comprises:
  a controller for determining the rate of the timing events, for decreasing the operating voltage as long as the rate of the timing events is below a target level, and for increasing the operating voltage when the rate of the timing events exceeds the target level so as to search for a threshold voltage being the smallest value of the operating voltage at which the rate of the timing events is substantially at the target level, and
  a controllable clock signal generator for producing a clock signal for operating the electronic device, the clock frequency $F_{clk}$ that represents the pulse rate of the clock signal being according to an increasing function of the operating voltage such that the rate of the timing events is substantially at the target level when the operating voltage is above the threshold voltage, and the rate of the timing events exceeds the target level when the operating voltage is below the threshold voltage.

In this document, the term "increasing function" means a function whose derivative is positive, e.g. $dF_{clk}/dVDD>0$, i.e. the clock frequency decreases when the operating voltage decreases and increases when the operating voltage increases. The above mentioned rate of the timing events can be, for example but not necessarily, the rate of errors related to the operation of the electronic device.

As the above-mentioned clock frequency $F_{clk}$ is varied together with the operating voltage VDD when searching for the above-mentioned threshold voltage, it is possible to find a voltage-frequency operating point where the energy consumption of the electronic device is minimized so that the detected timing event rate is however kept at an acceptable level and thus the performance does not crash. The control system is advantageously configured to operate during the operation of the electronic device so as to dynamically adapt the operating voltage VDD and the clock frequency $F_{clk}$ with respect to changes in operating conditions, e.g. temperature.

In accordance with the invention, there is provided also a new electronic system that comprises:
  an electronic device provided with a timing event detector responsive to timing events related to the operation of the electronic device, and
  a control system according to the invention for controlling operating voltage supplied to the electronic device.

The electronic device may further comprise error-repair and/or error prevention logic responsive to errors related to the operation of the electronic device so as to repair the errors related to the operation of the electronic device.

In accordance with the invention, there is provided also a new method for controlling operating voltage supplied to an electronic device provided with a timing event detector responsive to timing events related to operation of the electronic device. A method according to the invention comprises:
  determining the rate of the timing events, and
  decreasing the operating voltage as long as the rate of the timing events is below a target level and increasing the operating voltage when the rate of the timing events exceeds the target level so as to search for a threshold voltage being the smallest value of the operating voltage at which the rate of the timing events is substantially at the target level.

In the method according to the invention, the clock frequency that represents the pulse rate of the clock signal operating the electronic device is according to an increasing function of the operating voltage such that the rate of the timing events is substantially at the target level when the operating voltage is above the threshold voltage, and the rate of the timing events exceeds the target level when the operating voltage is below the threshold voltage.

In accordance with the invention, there is provided also a new computer program for controlling operating voltage supplied to an electronic device provided with a timing event detector responsive to timing events related to operation of the electronic device. A computer program according to the invention comprises computer executable instructions for controlling a programmable processing system to:
  determine the rate of the timing events,
  decrease the operating voltage as long as the rate of the timing events is below a target level and increase the operating voltage when the rate of the timing events exceeds the target level so as to search for a threshold voltage being the smallest value of the operating voltage at which the rate of the timing events is substantially at the target level, and
  control a controllable clock signal generator to produce a clock signal for operating the electronic device, the clock frequency being according to an increasing function of the operating voltage such that the rate of the timing events is substantially at the target level when the operating voltage is above the threshold voltage, and the rate of the timing events exceeds the target level when the operating voltage is below the threshold voltage.

In accordance with the invention, there is provided also a new computer program product. The computer program product comprises a non-volatile computer readable medium, e.g. a compact disc "CD", encoded with a computer program according to the invention.

In accordance with the invention, there is provided also a new signal that carries information defining a computer program according to an embodiment of invention. The signal can be received for example from a communication network, e.g. from a cloud service.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features.

The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description below are not exhaustive unless otherwise explicitly stated.

Figure 1:
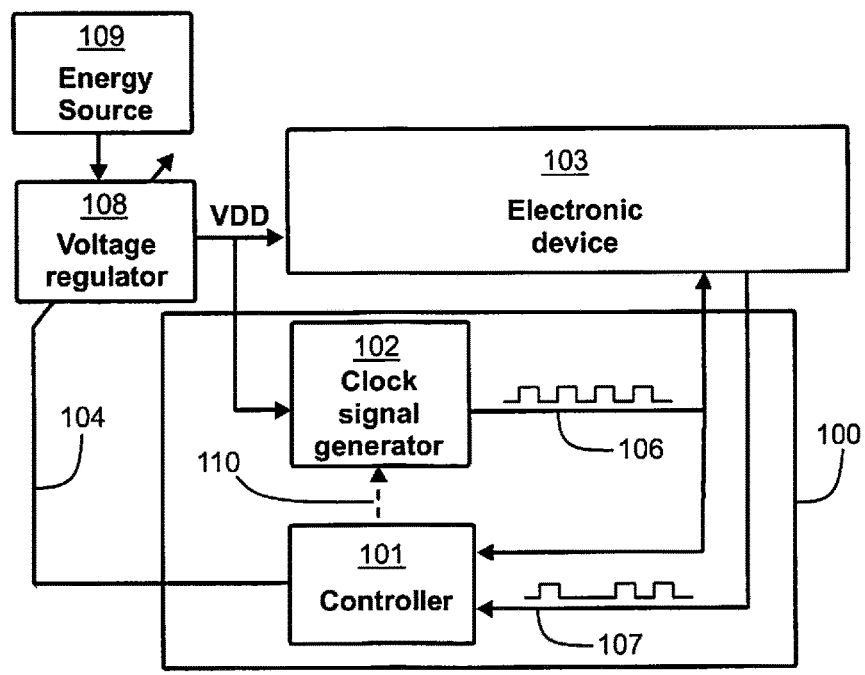
FIG. 1 shows a functional block diagram of an electronic system comprising a control system according to an exemplifying and non-limiting embodiment of the invention for controlling operating voltage of the electronic system.

FIG. 1 shows a functional block diagram of an electronic system according to an exemplifying and non-limiting embodiment of the invention. The electrical system comprises an electronic device 103 that can be for example a digital processor circuit. The electronic device 103 is provided with a timing event detector responsive to timing events, e.g. errors, related to operation of the electronic device. The electronic device 103 produces a timing event signal 107 that comprises pulses corresponding to timing events related to the operation of the electronic device. For example, each pulse in the timing event signal 107 may correspond to, for example but not necessarily, one error in the operation of the electronic device 103. In addition to the timing event detector, the electronic device 103 may further comprise error-repair and/or error prevention logic responsive to errors so as to repair the errors. An exemplifying electronic device which is provided with a timing event detector and error-repair and/or error prevention logic of the kind mentioned above can be found e.g. from the publication US20070288798.

The electronic system comprises a control system 100 for controlling operating voltage VDD supplied to the electronic device 103. The control system 100 is configured to produce a voltage control signal 104 for controlling a voltage regulator 108. The voltage regulator 108 is configured to convert voltage of an energy source 109 into direct "DC" voltage whose value depends on the voltage control signal 104. The voltage regulator 108 can be for example a switched mode DC-DC converter or an AC-DC converter. The energy source 109 can be for example a battery, a fuel cell, a power grid supplying alternative voltage, or an energy harvested source The control system 100 comprises a controllable clock signal generator 102 for producing a clock signal 106 for operating the electronic device 103. The control system 100 further comprises a controller 101 for determining the rate of timing events, e.g. errors, related to the operation of the electronic device 103. The rate of timing events can be determined for example with the aid of two counters so that one of the counters counts pulses of the clock signal 106 and the other one of the counters counts pulses of the timing event signal 107. The rate of timing events can be defined for example as a ratio of the number of the pulses of the timing event signal 107 and the number of the pulses of the clock signal 106 counted during a suitable sample period. The controller 101 is configured to decrease the operating voltage VDD as long as the rate of timing events is below a predetermined target level, and to increase the operating voltage VDD when the rate of the timing events exceeds the target level so as to search for a threshold voltage Vth that is the smallest value of the operating voltage at which the rate of the timing events is substantially at the target level. The target level can be for example 0.1%, i.e. the pulse rate of the timing event signal 107 is 1000 times smaller than the pulse rate of the clock signal 106.

The controllable clock signal generator 102 is configured produce the clock signal 106 so that the clock frequency $F_{clk}$ that represents the pulse rate of the clock signal 106 is according to an increasing function of the operating voltage VDD such that the rate of timing events is substantially at the target level when the operating voltage is above the threshold voltage Vth and the rate of timing events exceeds the target level when the operating voltage is below the threshold voltage.

Figure 2:
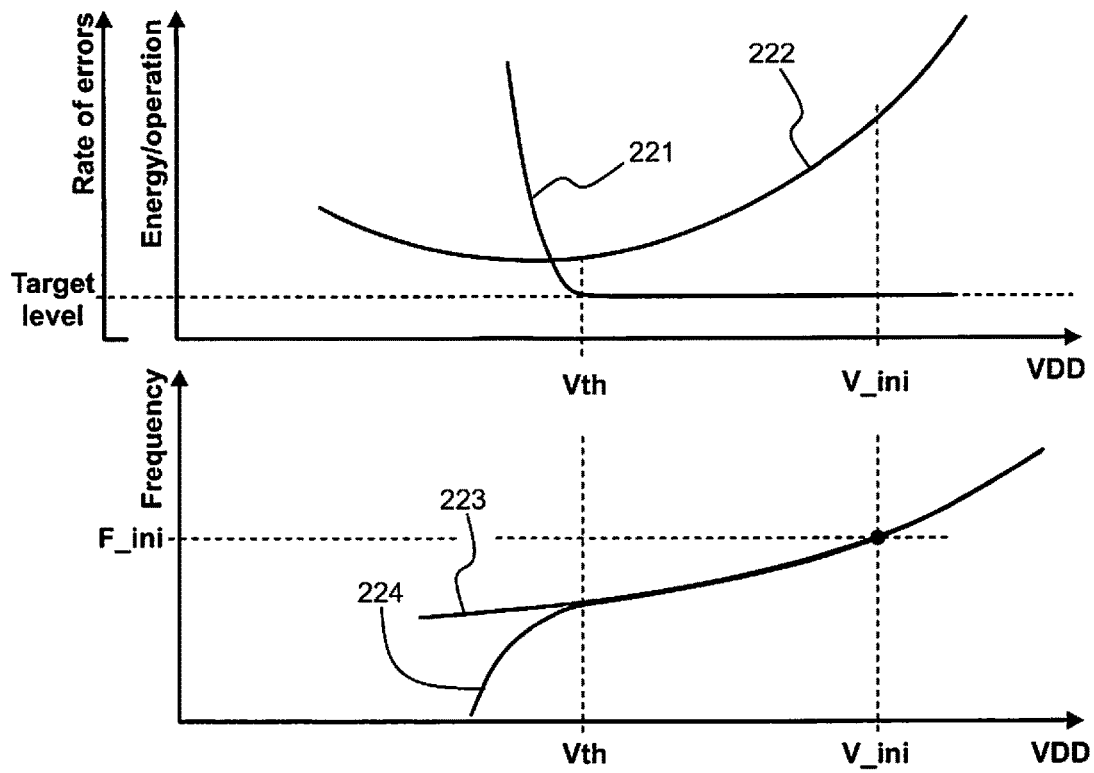
FIG. 2 illustrates the operation of the control system shown in FIG. 1.

FIG. 2 illustrates an exemplifying case where the timing events being detected are errors related to the operation of the electronic device 103. Thus, in FIG. 2, the rate of the detected timing events is the rate of errors. In FIG. 2, the rate of errors as a function of the operating voltage VDD is depicted with a curve 221 and the clock frequency $F_{clk}$ as the above-mentioned increasing function of the operating voltage VDD is depicted with a curve 223. On the curve 223, the clock frequency $F_{clk}$ can be substantially according to the following equation (1) when the operating voltage VDD is sufficiently greater than the threshold voltage Vth:

$$F_{clk} \propto \frac{KC_g VDD}{(VDD - Vth)^{\alpha v}}, \quad (1)$$

where K is a delay-fitting parameter, $C_g$ is the output capacitance of the characteristic inverter related to the transistor technology of the electronic device, and $\alpha v$ is the velocity saturation index that is between 1 and 2. The curve 223 can be approximated for example with a suitable polynomial function of the VDD.

As cap be seen from FIG. 2, the rate of errors depicted with the curve 221 is substantially at the target level when the operating voltage VDD is above the threshold voltage Vth and the clock frequency $F_{clk}$ is according to the curve 223. The rate of errors increases rapidly when the operating voltage VDD is decreased below the threshold voltage Vth and the clock frequency $F_{clk}$ is according to the curve 223. In FIG. 2, a curve 224 illustrates how the clock frequency $F_{clk}$ should be decreased when the operating voltage VDD decreases below the threshold voltage Vth in order to keep the rate of errors at the target level. On the curve 224, the clock frequency $F_{clk}$ can be substantially according to the following equation (2) when the operating voltage VDD is less than or equal to the threshold voltage Vth:

$$F_{clk} \propto \frac{KC_g VDD}{I_O \exp\left(\frac{VDD - Vth}{nU_T}\right)}, \quad (2)$$

where $I_O$ is the ON current of the characteristic inverter related to the transistor technology of the electronic device, n is the sub-threshold swing coefficient, and $U_T$ is the thermodynamic voltage. More detailed information about the above-presented equations can be found from e.g.: Wang A., Calhoun B., and Chandrakasan A, *Sub-threshold Design for Ultra Low-Power Systems*, Springer, 2005.

As can be seen from FIG. 2, the curves 223 and 224 coincide when the operating voltage VDD is above the threshold voltage Vth, and the curves 223 and 224 deviate from each other when the operating voltage VDD is below the threshold voltage Vth. A curve 222 shown in FIG. 2 illustrates the average energy consumption per operation of the electronic device 103. The operation can be for example an arithmetic-logical operation, writing to a register, or reading from a register. As illustrated by the curve 222, the energy per operation is high when the operating voltage VDD is high or when the operating voltage VDD is low. A high operating voltage causes high energy consumption per operation because electrical currents for charging and discharging internal capacitances of the electronic device 103 grow along with the operating voltage, whereas a low operating voltage causes high energy consumption per operation because of leakage currents through semiconductor switches of the electronic device 103.

As can be seen from FIG. 2, the minimum of the energy per operation is located in the vicinity of the threshold voltage Vth. It has been noticed that in conjunction with many types of electronic devices, e.g. CMOS circuits, the minimum of the energy per operation is located in the vicinity of a threshold voltage at which the rate of errors starts to rapidly grow when the operating voltage decreases below the threshold voltage and the clock frequency is according to a downwards convex increasing function of the operating voltage. The term "downwards convex function" means that the graph of the function is at each point under consideration above the tangent of the graph. Thus, the energy consumption of the electronic device 103 can be optimized by controlling the operating voltage VDD to be the threshold voltage Vth or slightly above, e.g. 1-10%, the threshold voltage Vth.

In a control system according to an exemplifying and non-limiting embodiment of the invention, the controllable clock signal generator 102 is constructed with electrical components which have been selected to produce the clock signal 106 so that the clock frequency $F_{clk}$ behaves in a desired way when the operating voltage VDD changes, i.e. the clock frequency $F_{clk}$ is according to the desired increasing function of the operating voltage VDD. The controllable clock signal generator 102 may comprise for example a voltage-controlled-oscillator "VCO" that is responsive to the operating voltage VDD in accordance with to the desired increasing function of the operating voltage VDD.

In some cases, there can be however a need to tune the controllable clock signal generator 102 to produce the clock signal 106 so that the clock frequency $F_{clk}$ behaves in a desired way when the operating voltage VDD changes. In a control system according to an exemplifying and non-limiting embodiment of the invention, the controller 101 is configured to set, prior to searching for the threshold voltage Vth, the operating voltage VDD to have an initial value V_ini greater than the threshold voltage Vth and to control the controllable clock signal generator 102 to increase the clock frequency $F_{clk}$ when the rate of timing events, e.g. errors, is below the target level and to decrease the clock frequency $F_{clk}$ when the rate of timing events exceeds the target level so as to search for an initial value F_ini of the clock frequency $F_{clk}$ corresponding to the initial value V_ini of the operating voltage VDD. The controller 101 is configured to tune, on the basis of the initial values V_ini and F_ini, the controllable clock signal generator 102 to operate in the desired way, i.e. in accordance with the increasing function illustrated with the curve 223. In FIG. 1, the tuning of the controllable clock signal generator 102 is depicted with a dashed line arrow 110. The tuning can be for example setting an input bias voltage of a VCO so that $F_{clk}$=F_ini when VDD=V_ini.

Figure 3:
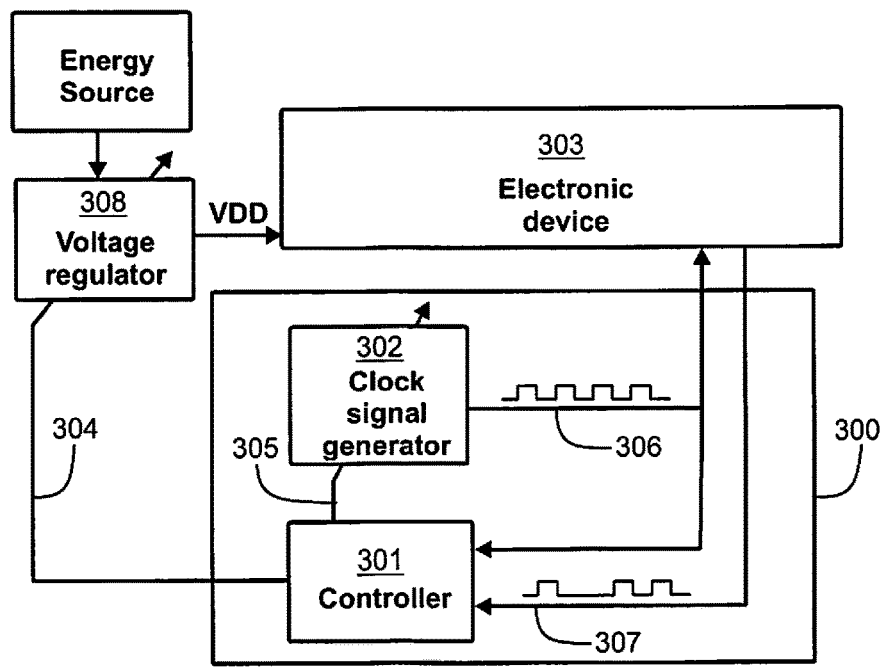
FIG. 3 shows a functional block diagram of an electronic system comprising a control system according to another exemplifying and non-limiting embodiment of the invention for controlling operating voltage of the electronic system.

FIG. 3 shows a functional block diagram of an electronic system according to an exemplifying and non-limiting embodiment of the invention. The electrical system comprises an electronic device 303 that is provided with a timing event detector responsive to timing events, e.g. errors, related to operation of the electronic device. The electronic device 303 produces a timing event signal 307 that comprises pulses corresponding to timing events related to the operation of the electronic device. In addition to the timing event detector, the electronic device 303 may further comprise error-repair and/or error prevention logic responsive to the errors so as to repair the errors related to the operation of the electronic device. The electronic system comprises a control system 300 for controlling operating voltage VDD supplied to the electronic device 303. The control system 300 is configured to produce a voltage control signal 304 for controlling a voltage regulator 308.

The control system 300 comprises a controllable clock signal generator 302 for producing a clock signal 306 so as to operate the electronic device 303. The control system 300 further comprises a controller 301 for determining the rate of timing events, e.g. errors, related to the operation of the electronic device 303. The controller 301 is configured to decrease the operating voltage VDD as long as the rate of timing events is below a target level, and to increase the operating voltage VDD when the rate of timing events exceeds the target level so as to search for a threshold voltage Vth that is the smallest value of the operating voltage VDD at which the rate of timing events is substantially at the target level.

The controller 301 is configured to produce a frequency control 305 signal for controlling the clock signal generator 302. The clock signal generator 302 is controlled to produce the clock signal 306 so that the clock frequency $F_{clk}$ is according to an increasing function of the operating voltage VDD such that the rate of timing events is substantially at the target level when the operating voltage is above the threshold voltage Vth and the rate of timing events exceeds the target level when the operating voltage is below the threshold voltage.

Figure 4:
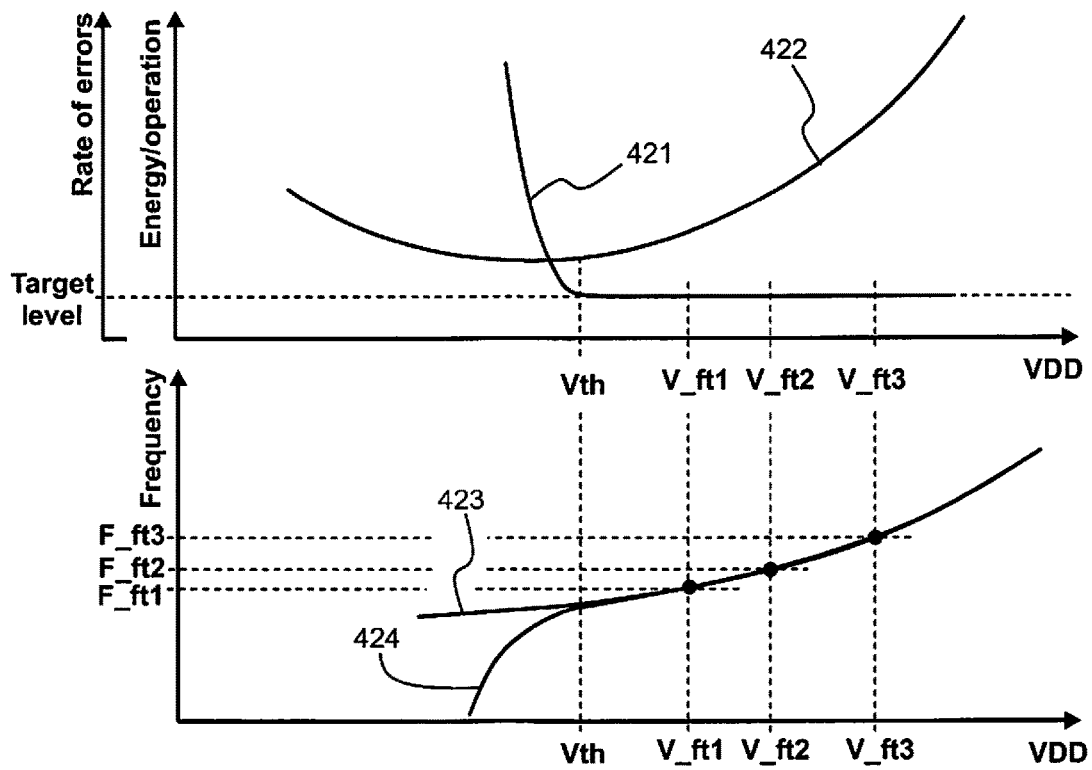
FIG. 4 illustrates the operation of the control system shown in FIG. 3.

FIG. 4 illustrates an exemplifying case where the timing events being detected are errors related to the operation of the electronic device 303. Thus, in FIG. 4, the rate of the detected timing events is the rate of errors. In FIG. 4, the rate of errors as a function of the operating voltage VDD is depicted with a curve 421 and the clock frequency $F_{clk}$ is depicted with a curve 423. On the curve 423, the clock frequency $F_{clk}$ can be substantially according to the above-presented equation (1) when the operating voltage VDD is sufficiently greater than the threshold voltage Vth. The curve 423 can be approximated for example with a suitable polynomial function of VDD.

As can be seen from FIG. 4, the rate of errors depicted with the curve 421 is substantially at the target level when the operating voltage VDD is above the threshold voltage Vth and the clock frequency $F_{clk}$ is according to the curve 423. The rate of errors increases rapidly when the operating voltage VDD is decreased below the threshold voltage Vth and the clock frequency $F_{clk}$ is according to the curve 423. In FIG. 4, a curve 424 illustrates how the clock frequency $F_{clk}$ should be decreased when the operating voltage VDD decreases below the threshold voltage Vth in order to keep the rate of errors at the target level. On the curve 424, the clock frequency $F_{clk}$ can be substantially according to the above-presented equation (2) when the operating voltage VDD is not greater than the threshold voltage Vth. A curve 422 shown in FIG. 4 illustrates the average energy consumption per operation of the electronic device 303. As illustrated in FIG. 4, the energy consumption of the electronic device 303 can be optimized by controlling the operating voltage VDD to be the threshold voltage Vth or slightly above, e.g. 1-10%, the threshold voltage Vth.

In the exemplifying control system 300 illustrated in FIG. 3, the controller 301 is configured to set, prior to searching for the threshold voltage Vth, the operating voltage VDD to have successively each of fitting voltage values V_ft1, V_ft2, and V_ft3 which are greater than the threshold voltage Vth. The controller 301 is configured to control, when the operating voltage has each of the fitting voltage values, the clock signal generator 302 to increase the clock frequency when the rate of errors is below the target level and to decrease the clock frequency when the rate of errors exceeds the target level so as to search for fitting frequency values F_ft1, F_ft2, and F_ft3 corresponding to the fitting voltage values V_ft1, V_ft2, and V_ft3 as illustrated in FIG. 4. The controller 301 is configured to determine, on the basis of the fitting voltage and fitting frequency values, one or more setting parameters related to the control of the clock frequency so as to set the clock frequency to be according to the increasing function of the operating voltage VDD such that the rate of errors is according to the curve 421. The controller 301 may comprise for example a digital signal processor "DSP" which is configured, with the aid of the above-mentioned setting parameters, to control the clock signal generator 302 so that the clock frequency is changed in the desired way when the operating voltage VDD is changed.

Figure 5:
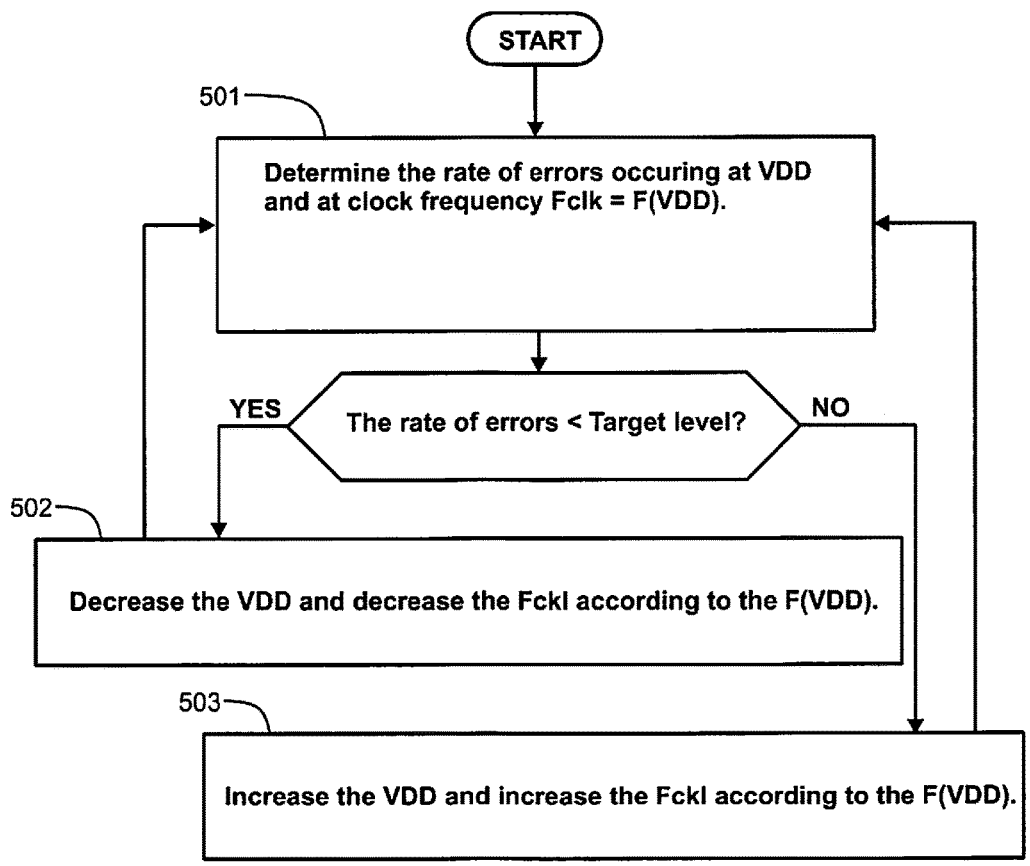
FIG. 5 shows a flowchart of a method according to an exemplifying and non-limiting embodiment of the invention for controlling operating voltage of an electronic device.

FIG. 5 shows a flowchart of a method according to an exemplifying and non-limiting embodiment of the invention for controlling operating voltage VDD supplied to an electronic device provided with a timing event detector responsive to timing events related to operation of the electronic device. The method comprises:
- action 501: determining the rate of timing events, and
- actions 502 and 503: decreasing the operating voltage VDD as long as the rate of timing events is below a target level and increasing the operating voltage when the rate of timing events exceeds the target level so as to search for a threshold voltage Vth being the smallest value of the operating voltage at which the rate of timing events is substantially at the target level.

In the method illustrated in FIG. 5, the clock frequency $F_{clk}$ that represents the pulse rate of a clock signal operating the electronic device is according to an increasing function F(VDD) of the operating voltage such that the rate of timing events is substantially at the target level when the operating voltage is above the threshold voltage and the rate of timing events exceeds the target level when the operating voltage is below the threshold voltage.

In a method according to an exemplifying and non-limiting embodiment of the invention, the clock signal is produced with a controllable clock signal generator comprising a voltage-controlled-oscillator responsive to the operating voltage in accordance with the increasing function of the operating voltage.

A method according to an exemplifying and non-limiting embodiment of the invention comprises producing a voltage control signal for controlling a voltage regulator to produce the operating voltage and a frequency control signal for controlling a controllable clock signal generator to produce the clock frequency in accordance with the increasing function of the operating voltage.

A method according to an exemplifying and non-limiting embodiment of the invention comprises:
  setting, prior to searching for the threshold voltage, the operating voltage to have an initial value greater than the threshold voltage,
  increasing the clock frequency when the rate of timing events is below the target level and decreasing the clock frequency when the rate of timing events exceeds the target level so as to search for an initial value of the clock frequency corresponding to the initial value of the operating voltage, and
  tuning, on the basis of the initial values of the operating voltage and the clock frequency, a controllable clock signal generator to operate in accordance with the increasing function of the operating voltage.

A method according to an exemplifying and non-limiting embodiment of the invention comprises:
  setting, prior to searching for the threshold voltage, the operating voltage to successively have each of fitting voltage values each being greater than the threshold voltage,
  when the operating voltage has each of the fitting voltage values, increasing the clock frequency when the rate of timing events is below the target level and decreasing the clock frequency when the rate of timing events exceeds the target level so as to search for fitting frequency values corresponding to the fitting voltage values, and
  determining, on the basis of the fitting voltage values and the fitting frequency values, one or more setting parameters related to the control of the clock frequency so as to set the clock frequency to be according to the increasing function of the operating voltage.

In a method according to an exemplifying and non-limiting embodiment of the invention, the increasing function of the operating voltage is a downwards convex increasing function of the operating voltage. For example, the increasing function of the operating voltage can be substantially according to the following equation when the operating voltage VDD is sufficiently greater than the threshold voltage Vth:

$$F_{clk} \propto \frac{KC_g VDD}{(VDD - Vth)^{\alpha v}},$$

where $F_{clk}$ is the clock frequency, K is a delay-fitting parameter, $C_g$ is the output capacitance of the characteristic inverter related to the transistor technology of the electronic device, Vth is the threshold voltage, and $\alpha v$ is the velocity saturation index that is between 1 and 2.

In a method according to an exemplifying and non-limiting embodiment of the invention, the determination of the rate of timing events comprises:
  receiving a timing event signal comprising pulses corresponding to the timing events related to the operation of the electronic device,
  receiving the clock signal, and
  computing the rate of timing events on the basis of an amount of the pulses of the timing event signal occurring during a sample period and an amount of pulses of the clock signal occurring during the same sample period.

A computer program according to an exemplifying and non-limiting embodiment of the invention comprises computer executable instructions for controlling a programmable processing system to carry out actions related to a method according to any of the above-described exemplifying embodiments of the invention.

A computer program according to an exemplifying and non-limiting embodiment of the invention comprises software modules for controlling operating voltage supplied to an electronic device provided with a timing event detector responsive to timing events related to operation of the electronic device. The software modules comprise computer executable instructions for controlling a programmable processing system to:

determine the rate of timing events, decrease the operating voltage as long as the rate of timing events is below a target level and increase the operating voltage when the rate of timing events exceeds the target level so as to search for a threshold voltage being the smallest value of the operating voltage at which the rate of timing events is substantially at the target level, and control a controllable clock signal generator to produce a clock signal for operating the electronic device so that the clock frequency representing the pulse rate of the clock signal is according to an increasing function of the operating voltage such that the rate of timing events is substantially at the target level when the operating voltage is above the threshold voltage and the rate of timing events exceeds the target level when the operating voltage is below the threshold voltage.

The above-mentioned software modules can be e.g. subroutines or functions implemented with a suitable programming language and with a compiler suitable for the programming language and the programmable processing system under consideration. It is worth noting that also a source code corresponding to a suitable programming language represents the computer executable software modules because the source code contains the information needed for controlling the programmable processing system to carry out the above-presented actions and compiling changes only the format of the information. Furthermore, it is also possible that the programmable processing system is provided with an interpreter so that a source code implemented with a suitable programming language does not need to be compiled prior to running.

A computer program product according to an exemplifying and non-limiting embodiment of the invention comprises a computer readable medium, e.g. a compact disc "CD", encoded with a computer program according to an embodiment of invention.

A signal according to an exemplifying and non-limiting embodiment of the invention is encoded to carry information defining a computer program according to an embodiment of invention.

Figure 6:
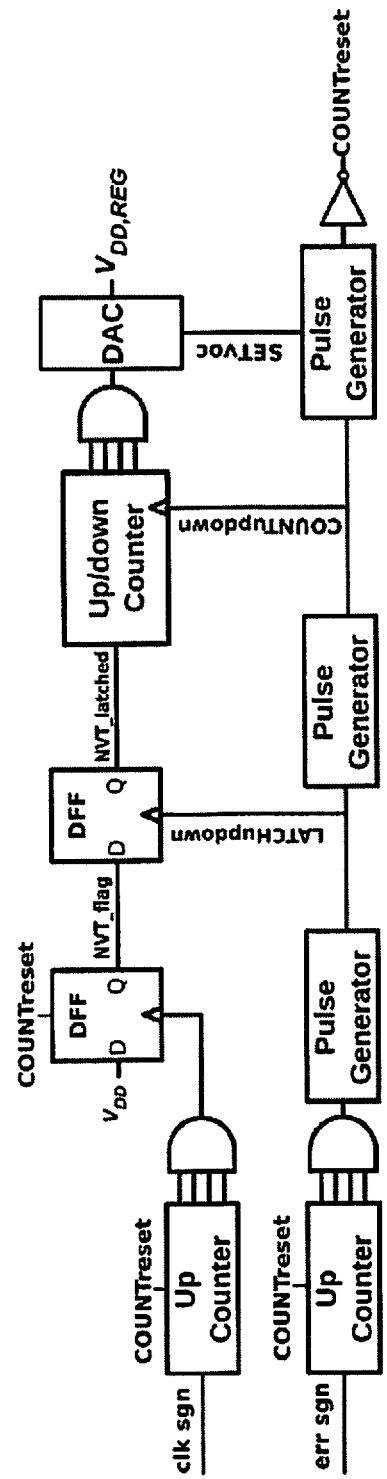
FIG. 6 illustrates implementation of a part of an exemplifying test system for verifying the usability of an exemplifying and non-limiting embodiment of the invention.

Example Case:

The above-described method for controlling the operating voltage was confirmed with a test system that is similar to the electronic system shown in FIG. 1. In the test system, the electronic device 103 is a 32-bit microprocessor based on the CMOS technology and provided with a timing event detector. The implementation of the controller 101 of the test system is shown in FIG. 6 where "clk sgn" is the clock signal 106 and "err sgn" is the timing event signal 107. The operating voltage VDD and correspondingly the clock frequency $F_{clk}$ were reduced so that the clock frequency was reduced substantially quadratically as a function of the operating voltage until an increase in the rate of timing events, such as e.g. errors, was observed. The point at which the rate of timing events increases is approximately the threshold voltage Vth slightly above which the energy consumption is optimized.

Two tests were carried out. In these tests, the timing events being detected are errors related to the operation of the electronic device. In the first test, the body bias "BB" voltage was lower than in the second test. The measured results of the first test are shown in Table 1 below.

TABLE 1

| $F_{ckt}$/MHz | VDD/Volts | Number of errors within a sample period |
|---|---|---|
| 25.0 | 0.40 | 0 |
| 21.6 | 0.39 | 0 |
| 18.7 | 0.38 | 0 |
| 16.1 | 0.37 | 0 |
| 13.8 | 0.36 | 0 |
| 11.9 | 0.35 | 1000 |
| 10.2 | 0.34 | >1000 |

In the first test, the threshold voltage Vth is approximately 0.35 V.

The measured results of the second test are shown in Table 2 below.

TABLE 2

| $F_{ckt}$/MHz | VDD/Volts | Number of errors within a sample period |
|---|---|---|
| 11.3 | 0.40 | 0 |
| 9.85 | 0.39 | 0 |
| 8.51 | 0.38 | 1 |
| 7.34 | 0.37 | counter overflow |

In the second test, the threshold voltage Vth is approximately 0.38 V.

The specific examples provided in the description given above should not be construed as limiting the scope and/or the applicability of the appended claims. Lists and groups of examples provided in the description given above are not exhaustive unless otherwise explicitly stated.

What is claimed is:

1. A control system for controlling operating voltage supplied to an electronic device provided with a timing event detector responsive to timing events related to operation of the electronic device, the control system comprising:
   a controller for determining a rate of the timing events, for decreasing the operating voltage as long as the rate of the timing events is below a target level, and for increasing the operating voltage when the rate of the timing events exceeds the target level so as to search for a threshold voltage being a smallest value of the operating voltage at which the rate of the timing events is effectively at the target level, and
   a controllable clock signal generator for producing a clock signal for operating the electronic device,
   wherein a clock frequency representing a pulse rate of the clock signal is based on an increasing function of the operating voltage, the rate of the timing events being effectively at the target level when the operating voltage is above the threshold voltage and the clock frequency is according to the increasing function of the operating voltage, and the rate of the timing events exceeding the target level when the operating voltage is below the threshold voltage and the clock frequency is according to the increasing function of the operating voltage.

2. A control system according to claim 1, wherein the controllable clock signal generator comprises a voltage-controlled-oscillator responsive to the operating voltage in accordance with the increasing function of the operating voltage.

3. A control system according to claim 1, wherein the controller is configured to produce a voltage control signal for controlling a voltage regulator to produce the operating voltage and a frequency control signal for controlling the controllable clock signal generator to produce the clock frequency in accordance with the increasing function of the operating voltage.

4. A control system according to claim 1, wherein the controller is configured to:
- set, prior to searching for the threshold voltage, the operating voltage to have an initial value greater than the threshold voltage,
- control the controllable clock signal generator to increase the clock frequency when the rate of the timing events is below the target level and to decrease the clock frequency when the rate of the timing events exceeds the target level so as to search for an initial value of the clock frequency corresponding to the initial value of the operating voltage, and
- tune, on the basis of the initial values of the operating voltage and the clock frequency, the controllable clock signal generator to operate in accordance with the increasing function of the operating voltage.

5. A control system according to claim 1, wherein the controller is configured to:
- set, prior to searching for the threshold voltage, the operating voltage to successively have each of fitting voltage values each being greater than the threshold voltage,
- control, when the operating voltage has each of the fitting voltage values, the controllable clock signal generator to increase the clock frequency when the rate of the timing events is below the target level and to decrease the clock frequency when the rate of the timing events exceeds the target level so as to search for fitting frequency values corresponding to the fitting voltage values, and
- determine, on the basis of the fitting voltage values and the fitting frequency values, one or more setting parameters related to control of the clock frequency so as to set the clock frequency to be according to the increasing function of the operating voltage.

6. A control system according to claim 1, wherein the increasing function of the operating voltage is a downwards convex increasing function of the operating voltage.

7. A control system according to claim 6, wherein the increasing function of the operating voltage is effectively calculated according to the following equation:

$$F\_clk \propto (KC\_gVDD)/([(VDD-Vth)]^{\alpha v}), \text{ when } VDD > Vth,$$

where Fclk is the clock frequency, K is a delay-fitting parameter, Cg is an output capacitance of a characteristic inverter related to transistor technology of the electronic device, Vth is the threshold voltage, and $\alpha v$ is a velocity saturation index that is between 1 and 2.

8. A control system according to claim 1, wherein the controller is configured to:
- receive an timing event signal comprising pulses corresponding to the timing events related to the operation of the electronic device,
- receive the clock signal, and
- compute the rate of the timing events on the basis of an amount of the pulses of the timing event signal occurring during a sample period and an amount of pulses of the clock signal occurring during the same sample period.

9. An electronic system comprising:
- an electronic device provided with a timing event detector responsive to timing events related to operation of the electronic device, and
- a control system according to claim 1 for controlling operating voltage supplied to the electronic device.

10. An electronic system according to claim 9, wherein the electronic device comprises error-repair and/or error prevention logic responsive to the errors so as to repair the errors related to the operation of the electronic device.

11. A method for controlling operating voltage supplied to an electronic device provided with a timing event detector responsive to timing events related to operation of the electronic device, the method comprising:
- determining a rate of the timing events, and
- decreasing the operating voltage as long as the rate of the timing events is below a target level and increasing the operating voltage when the rate of the timing events exceeds the target level so as to search for a threshold voltage being a smallest value of the operating voltage at which the rate of the timing events is effectively at the target level, wherein a clock frequency representing a pulse rate of a clock signal operating the electronic device is based on an increasing function of the operating voltage, the rate of the timing events being effectively at the target level when the operating voltage is above the threshold voltage and the clock frequency is according to the increasing function of the operating voltage, and the rate of the timing events exceeding the target level when the operating voltage is below the threshold voltage and the clock frequency is according to the increasing function of the operating voltage.

12. A method according to claim 11, wherein the clock signal is produced with a controllable clock signal generator comprising a voltage-controlled-oscillator responsive to the operating voltage in accordance with the increasing function of the operating voltage.

13. A method according to claim 11, wherein the method comprises producing a voltage control signal for controlling a voltage regulator to produce the operating voltage and a frequency control signal for controlling a controllable clock signal generator to produce the clock frequency in accordance with the increasing function of the operating voltage.

14. A method according to claim 11, wherein the method comprises:
- setting, prior to searching for the threshold voltage, the operating voltage to have an initial value greater than the threshold voltage,
- increasing the clock frequency when the rate of the timing events is below the target level and decreasing the clock frequency when the rate of the timing events exceeds the target level so as to search for an initial value of the clock frequency corresponding to the initial value of the operating voltage, and
- tuning, on the basis of the initial values of the operating voltage and the clock frequency, a controllable clock signal generator to operate in accordance with the increasing function of the operating voltage.

15. A method according to claim 13, wherein the method comprises:
- setting, prior to searching for the threshold voltage, the operating voltage to successively have each of fitting voltage values each being greater than the threshold voltage,
- when the operating voltage has each of the fitting voltage values, increasing the clock frequency when the rate of the timing events is below the target level and decreasing the clock frequency when the rate of the timing events exceeds the target level so as to search for fitting frequency values corresponding to the fitting voltage values, and determining, on the basis of the fitting voltage values and the fitting frequency values, one or more setting parameters related to control of the clock frequency so as to set the clock frequency to be according to the increasing function of the operating voltage.

16. A method according to claim 11, wherein the increasing function of the operating voltage is a downwards convex increasing function of the operating voltage.

17. A method according to claim 16, wherein the increasing function of the operating voltage is effectively calculated according to the following equation:

$$F\_clk \propto (KC\_gVDD)/([(VDD-Vth)]\hat{\ }\alpha v), \text{ when } VDD>Vth,$$

where Fclk is the clock frequency, K is a delay-fitting parameter, Cg is an output capacitance of a characteristic inverter related to transistor technology of the electronic device, Vth is the threshold voltage, and αv is a velocity saturation index that is between 1 and 2.

18. A method according to claim 11, wherein the determining the rate of the timing events comprises:

receiving an timing event signal comprising pulses corresponding to the timing events related to the operation of the electronic device, receiving the clock signal, and computing the rate of the timing events on the basis of an amount of the pulses of the timing event signal occurring during a sample period and an amount of pulses of the clock signal occurring during the same sample period.

19. A non-transitory computer readable storage medium storing a computer program for controlling an operating voltage supplied to an electronic device provided with a timing event detector responsive to timing events related to operation of the electronic device, the computer program comprising computer executable instructions which when executed by a computer causes the computer to:

determine a rate of the timing events, decrease the operating voltage as long as a rate of the timing events is below a target level and increase the operating voltage when the rate of the timing events exceeds the target level so as to search for a threshold voltage being a smallest value of the operating voltage at which the rate of the timing events is effectively at the target level, and control a controllable clock signal generator to produce a clock signal for operating the electronic device, wherein a clock frequency representing a pulse rate of the clock signal is based on an increasing function of the operating voltage, the rate of the timing events being effectively at the target level when the operating voltage is above the threshold voltage and the clock frequency is according to the increasing function of the operating voltage, and the rate of the timing events exceeding the target level when the operating voltage is below the threshold voltage and the clock frequency is according to the increasing function of the operating voltage.

* * * * *